US011039578B2

(12) United States Patent
Tranberg

(10) Patent No.: US 11,039,578 B2
(45) Date of Patent: Jun. 22, 2021

(54) APPARATUS AND SYSTEM FOR TRANSPORTING A LENGTH OF GROWTH MEDIUM CUT INTO PIECES OF SUITABLE SIZE INTO A PROPAGATION TRAY

(71) Applicant: Ellepot A/S, Esbjerg (DK)

(72) Inventor: Thomas Lindberg Tranberg, Varde (DK)

(73) Assignee: ELLEPOT A/S, Esbjerg (DK)

( * ) Notice: Subject to any disclaimer, the term of this patent is extended or adjusted under 35 U.S.C. 154(b) by 206 days.

(21) Appl. No.: 16/304,602

(22) PCT Filed: Jun. 13, 2017

(86) PCT No.: PCT/EP2017/064377
§ 371 (c)(1),
(2) Date: Nov. 26, 2018

(87) PCT Pub. No.: WO2017/216146
PCT Pub. Date: Dec. 21, 2017

(65) Prior Publication Data
US 2019/0216024 A1    Jul. 18, 2019

(30) Foreign Application Priority Data
Jun. 17, 2016    (DK) .......................... PA 2016 00357

(51) Int. Cl.
*A01G 9/02*    (2018.01)
*A01G 9/029*   (2018.01)
*A01G 3/00*    (2006.01)

(52) U.S. Cl.
CPC ............ *A01G 9/0299* (2018.02); *A01G 3/00* (2013.01); *A01G 9/0295* (2018.02)

(58) Field of Classification Search
CPC ....... A01G 3/00; A01G 9/0299; A01G 9/0295
See application file for complete search history.

(56) References Cited

U.S. PATENT DOCUMENTS

| 4,043,231 A | 8/1977 | Friedberg |
| 4,656,811 A | 4/1987 | Dedolph |
| 6,138,410 A * | 10/2000 | Oglevee ................. B65D 85/52 47/62 C |
| 2010/0006607 A1 | 1/2010 | Morse et al. |

(Continued)

FOREIGN PATENT DOCUMENTS

| CA | 2856091 A1 * | 12/2012 | ............. A01H 4/001 |
| EP | 0090910 | 10/1983 | |
| EP | 0722655 | 7/1996 | |

(Continued)

OTHER PUBLICATIONS

Ellepot Multiflex Forestry Seedier Line: "Ellepot Multiflex Forestry Seedier Line," Feb. 15, 2012. Retrieved from the Internet Aug. 25, 2017, https://www.youtube.com/watch?v=9Wn8kj.

(Continued)

*Primary Examiner* — Monica L Barlow
*Assistant Examiner* — Aaron M Rodziwicz
(74) *Attorney, Agent, or Firm* — Morse, Barnes-Brown & Pendleton, P.C.; Sean S. Detweiler, Esq.

(57) ABSTRACT

The present invention relates to an apparatus and system for transporting a length of growth medium cut into pieces of suitable size into a propagation tray.

8 Claims, 5 Drawing Sheets

(56) References Cited

U.S. PATENT DOCUMENTS

2012/0174839 A1\* 7/2012 Faulring .............. A01G 9/0299
111/100

FOREIGN PATENT DOCUMENTS

| EP | 0722655 A1 \* | 7/1996 | ............. A01G 24/60 |
|----|----|----|----|
| EP | 0806131 A1 \* | 11/1997 | ........... A01G 9/0299 |
| NL | 8701267 | 12/1988 | |
| NL | 9201107 | 1/1994 | |
| WO | WO 92/03914 | 3/1992 | |
| WO | WO 94/19927 | 8/1994 | |
| WO | WO 2011/162608 | 12/2011 | |
| WO | WO-2015152206 A1 \* | 10/2015 | ............. A01G 9/027 |
| WO | WO-2015183094 A1 \* | 12/2015 | ............. A01G 9/085 |
| WO | WO-2015198655 A1 \* | 12/2015 | ............. A01G 9/086 |
| WO | WO-2016066903 A1 \* | 5/2016 | ........... A01C 11/025 |
| WO | WO-2016129673 A1 \* | 8/2016 | ........... A01G 7/045 |
| WO | WO-2016132486 A1 \* | 8/2016 | ........... A01G 9/0299 |
| WO | WO-2018132814 A1 \* | 7/2018 | ........... A01G 9/0299 |

OTHER PUBLICATIONS

Ellepot: "GreenTech 2014 Maskin Videor," Jun. 4, 2014. Retrieved from the Internet on Aug. 24, 2017, https://vimeo.com/97321713.
TheEllepot: "Ellepot Flexline-Forestry," Oct. 20, 2011. Retrieved from the Internet Aug. 28, 2017, https://www.youtube.com/watch?v=XRgCLs.
TheEllepot: "NGL Ellepot Line for Forestry Pines," Apr. 3, 2014. Retrieved from the Internet on Aug. 28, 2017, https://www.youtube.com/watch?v=ukqlGH.
International Search Report from PCT/EP2017/064377, dated Aug. 31, 2017.
International Search Report from PA 201600357, dated Jan. 9, 2017.

\* cited by examiner

APPARATUS AND SYSTEM FOR TRANSPORTING A LENGTH OF GROWTH MEDIUM CUT INTO PIECES OF SUITABLE SIZE INTO A PROPAGATION TRAY

RELATED APPLICATIONS

This application is a national stage filing under 35 U.S.C. 371 of International Application No. PCT/EP2017/064377, filed Jun. 13, 2017, which claims priority to Denmark Application No. PA 2016 00357, filed Jun. 17, 2016. The entire teachings of said applications are incorporated by reference herein. International Application PCT/EP2017/064377 was published under PCT Article 21(2) in English.

TECHNICAL FIELD OF THE INVENTION

The present invention relates to the production of growth medium pots. More particularly, the present invention relates to an apparatus and system for transporting a length of growth medium cut into pieces of suitable size into a propagation tray.

BACKGROUND OF THE INVENTION

For the propagation of plants, starting either from seeds or from cuttings, it is well-known in the art to use small pots. The pots are traditionally made in a continuous process as disclosed in WO9203914 to obtain a cheap product that is relatively easy to handle. When the continuous blocks of growth medium are cut into pots/pieces of suitable size, each individual piece of the continuous block of growth medium is manually or automatically positioned into a propagation tray. An example of an automatic system is the Ellepot Multiflex, where a distributor with an X-Y movement mechanism distributes the individual pieces of the continuous block of growth medium into a propagation tray. The pieces are positioned one at the time as they move in a single line from the cutting means to the distributor. This system is limited by the minimum size of the individual pieces of the continuous block of growth medium, as pieces with a relatively low size (height relative to the diameter) has a tendency to tilt during the transportation towards the distributor.

SUMMARY OF THE INVENTION

It is an object of the present invention to provide an apparatus that is capable of transporting low-size pots (height relative to the diameter) to a distributor adapted for positioning growth medium pots into a propagation tray.

A first aspect relates to an apparatus for transporting a length of growth medium cut into pieces of suitable size to a distributing means adapted for positioning the individual pieces of the length of growth medium into a propagation tray, the apparatus comprising:
a first displacement means adapted for:
a) positioning a length of growth medium cut into pieces of suitable size into a compartment of a compartmentalized conveyor through an open end and along the longitudinal direction of the compartment; and/or
b) positioning a length of growth medium cut into pieces of suitable size into a storage tray; wherein the storage tray is adapted for tilting or dropping a length of growth medium cut into pieces of suitable size into a compartment of a compartmentalized conveyor and/or
c) positioning a length of growth medium cut into pieces of suitable size directly into a distributing means adapted for positioning the individual pieces of the length of growth medium into a propagation tray.

The advantage of the first displacement means is that the apparatus adapted for producing a length of growth medium cut into pieces of suitable size can continue to produce during the distribution operation, thereby increasing the production.

In one or more embodiments, the first displacement means is adapted for positioning a single length of 2-50 growth medium pieces of suitable size into the above a)-c) options, such as within the range of 3-45, e.g. within the range of 4-40, such as within the range of 5-35, e.g. within the range of 6-30, such as within the range of 7-25, e.g. within the range of 8-20, such as within the range of 9-15, e.g. within the range of 10-15 individual growth medium pieces into the open-ended channel or cavity of the receiving unit.

A second aspect relates to an apparatus for transporting a length of growth medium cut into pieces of suitable size to a distributing means adapted for positioning the individual pieces of the length of growth medium into a propagation tray, the apparatus comprising:
a compartmentalized conveyor comprising a plurality of open-ended compartments adapted for receiving a single length of growth medium cut into pieces of suitable size; and
a first displacement means adapted for:
a) positioning a length of growth medium cut into pieces of suitable size into a compartment of the compartmentalized conveyor through its open end and along the longitudinal direction of the compartment; and/or
b) positioning a length of growth medium cut into pieces of suitable size into a storage tray; wherein the storage tray is adapted for tilting or dropping a length of growth medium cut into pieces of suitable size into a compartment of the compartmentalized conveyor.

A third aspect relates to an apparatus for transporting a length of growth medium cut into pieces of suitable size to a distributing means adapted for positioning the individual pieces of the length of growth medium into a propagation tray, the apparatus comprising:
a compartmentalized conveyor comprising a plurality of open-ended compartments adapted for receiving a single length of growth medium cut into pieces of suitable size; and
a first displacement means adapted for:
a) transporting a length of growth medium cut into pieces of suitable size into a compartment of the compartmentalized conveyor through its open end and along the longitudinal direction of the compartment; and/or
b) transporting a length of growth medium cut into pieces of suitable size into a storage tray; wherein the storage tray is adapted for tilting or dropping a length of growth medium cut into pieces of suitable size into a compartment of the compartmentalized conveyor.

When transporting a single length of growth medium cut into pieces of suitable size, the individual pieces are capable of supporting each other, thereby avoiding that they tilt during the transportation. Furthermore, the compartment is adapted to receive a "single" length. Hence, the size of the compartment also aids in stabilizing the position of the individual pieces. Preferably, the single length of growth medium pieces comprises 2-50 individual growth medium pieces, such as within the range of 3-45, e.g. within the range of 4-40, such as within the range of 5-35, e.g. within the range of 6-30, such as within the range of 7-25, e.g. within the range of 8-20, such as within the range of 9-15, e.g. within the range of 10-15 individual growth medium pieces.

The term "length of growth medium" refers to the production of growth medium, which is made in a continuous line as e.g. disclosed in WO9203914. The length of growth medium is thereafter cut into pieces of suitable size (height relative to the diameter), corresponding to the desired size of a propagation pot. Hence, a synonymous term to the term "length of growth medium" may be a "continuous block of growth medium".

The term "conveyor" is used in its broadest sense indicating any continuous moving support, but the invention has special application to belt or roller conveyors.

The term "conveyor belt," as used in the present disclosure, generally refers to any type of endless track or belt, typically configured to be driven by a geared mechanism or drum. The term "conveyor belt" should not be considered to be limited to any particular type of conveyor belt unless otherwise specified herein.

In one or more embodiments, the first displacement means comprises a spade blade (a plate or a blade), a first drive means, and a second drive means; wherein the spade blade is configured for fitting within a cutting groove between to individual growth medium pieces; wherein the first drive means is configured to move the spade blade from a first position above or below or to one side of a cutting groove between to individual growth medium pieces to a second position within said cutting groove; and wherein the second drive means is configured to move the spade blade towards:

a) said compartment of a compartmentalized conveyor through an open end and along the longitudinal direction of the compartment; and/or
b) said storage tray; and/or
c) said distributing means.

In one or more embodiments, the distributing means is configured to function as the first displacement means.

In one or more embodiments, the distributing means, in a loading position, is configured to encircle a length of growth medium cut into pieces of suitable size, and displace said length of growth medium to a position above a propagation tray; and configured, in an unloading position, to position the individual pieces of said length of growth medium into a propagation tray.

In one or more embodiments, the compartmentalized conveyor comprises a plurality of open-ended compartments adapted for receiving a single length of growth medium cut into pieces of suitable size In one or more embodiments, the compartmentalized conveyor comprises a belt with a plurality of open-ended compartments adapted for receiving a single length of growth medium cut into pieces of suitable size.

The term "open-ended" compartment is to be understood as a compartment partly or entirely extending from one longitudinal side of the conveyor to the other longitudinal side of the conveyor, and wherein one or more openings faces the longitudinal side(s) of the conveyor (e.g. the longitudinal sides of the conveyor belt). Preferably, the compartment extends perpendicular to the moving direction of the conveyor. The compartment may in some embodiments only be open in one end. In such a situation, the system comprises a storage tray adapted for positioning (such as tilting or dropping) a length of growth medium cut into pieces of suitable size into a compartment of the compartmentalized conveyor. The single open end is then facing the distributing means adapted for positioning the individual pieces of the length of growth medium into a propagation tray, since the length of growth medium cut into pieces of suitable size is preferably slid therein. The compartment may be fastened onto the conveyor, or may be an integral part of the conveyor, such as an integral part of a conveyor belt. The compartment is preferably elongate with its longest dimension extending perpendicular to the moving direction of the conveyor, but may also extend parallel to the moving direction of the conveyor.

In one or more embodiments, the apparatus further comprises a storage tray adapted for positioning (e.g. tilting or dropping) a length of growth medium cut into pieces of suitable size into a partly filled compartment of the compartmentalized conveyor.

In one or more embodiments, the apparatus further comprises a storage tray adapted for tilting or dropping a length of growth medium cut into pieces of suitable size into a compartment of the compartmentalized conveyor.

In one or more embodiments, the first displacement means comprises a spade blade, a first drive means, and a second drive means. The spade blade is preferably configured for fitting within a cutting groove between to individual growth medium pieces. In one or more embodiments, the first drive means is configured to move the spade blade from a first position above a cutting groove between to individual growth medium pieces to a second position within said cutting groove. In one or more embodiments, the first drive means is configured to move the spade blade from a first position above a cutting groove between to individual growth medium pieces to a second position within said cutting groove, while using the cutting blade of the apparatus adapted for producing a length of growth medium cut into pieces of suitable size as a guide.

In one or more embodiments, the second drive means is configured to move the spade blade above and along a length of growth medium cut into pieces of suitable size. Thereby, the first displacement means can be configured to move different lengths of growth medium cut into pieces of suitable size into a compartment of the compartmentalized conveyor.

In one or more embodiments, the first displacement means is configured to move varying lengths of growth medium cut into pieces of suitable size into a compartment of the compartmentalized conveyor.

In one or more embodiments, the apparatus further comprises a second displacement means adapted for transporting a length of growth medium cut into pieces of suitable size positioned within a compartment of the compartmentalized conveyor through the open end of the compartment and into a distributing means adapted for positioning the individual pieces into a propagation tray for cuttings, seeds and the like.

In one or more embodiments, the apparatus further comprises a second displacement means adapted for transporting length of growth medium cut into pieces of suitable size positioned within a compartment of the compartmentalized conveyor into a distributing means adapted for positioning the individual pieces into a propagation tray for cuttings, seeds and the like.

In one or more embodiments, the second displacement means comprises one or more spade blades, each adapted for moving within a single open-ended compartment; wherein the second displacement means further comprises a first drive means adapted to move the spade blades from a first position outside the open-ended compartment to a second position within the open-ended compartment. Thereby, the distributing means may be loaded with a length (or several lengths) of growth medium cut into pieces of suitable size in a single operation.

To avoid overloading of an individual compartment, the apparatus may in some embodiments further comprise means adapted for controlling the presence and/or absence of length of growth medium cut into pieces of suitable size within a compartment. Such means may e.g. be a photo sensor.

It may be an advantage to control the activation of the conveyor such that an empty compartment is positioned in front of the first displacement means and is moved away as it is filled.

In one or more embodiments, the apparatus further comprises a programmable control unit configured to activate and/or deactivate the first displacement means and the compartmentalized conveyor sequentially.

Similarly, it may an advantage to control the activation of the conveyor such that a filled compartment is positioned in front of the second displacement means and is moved away as it is emptied.

In one or more embodiments, the apparatus further comprises a programmable control unit configured to activate and/or deactivate the second displacement means and the compartmentalized conveyor sequentially.

It may be requested to fill a propagation tray with propagation pots of varying sizes.

In one or more embodiments, the first displacement means is configured for loading neighbouring compartments of the compartmentalized conveyor with varying lengths and/or diameters of lengths of growth medium cut into pieces of suitable size.

In one or more embodiments, the second displacement means is adapted for transporting a plurality of lengths of growth medium cut into pieces of suitable size positioned within individual compartments of the compartmentalized conveyor through the open end of the individual compartment and into a distributing means adapted for positioning the individual pieces into a propagation tray for cuttings, seeds and the like.

A fourth aspect relates to a system for positioning growth medium pots onto propagation trays comprising:

An apparatus according to the present invention and adapted for transporting a length of growth medium cut into pieces of suitable size to a distributing means; and A distributing means adapted for positioning the individual pieces of the length of growth medium into a propagation tray.

A fifth aspect relates to a system for packaging growth medium pots onto propagation trays comprising:

An apparatus according to the present invention; and

A distributing means adapted for positioning the individual pieces of the length of growth medium into a propagation tray.

In one or more embodiments, the system further comprises an apparatus adapted for producing a length of growth medium cut into pieces of suitable size. In one or more embodiments, the apparatus is adapted for producing a length of growth medium cut into pieces of suitable size is configured for positioning its outlet at multiple sites along the length of a compartmentalized conveyor.

In one or more embodiments, the system further comprises an apparatus adapted for producing a length of growth medium cut into pieces of suitable size, and wherein said apparatus is configured for positioning its outlet at multiple sites along the length of the compartmentalized conveyor.

In one or more embodiments, the system further comprises an apparatus adapted for producing a length of growth medium cut into pieces of suitable size, and wherein said apparatus comprises multiple outlets configured for positioning along the length of the compartmentalized conveyor.

In one or more embodiments, the apparatus adapted for producing a length of growth medium cut into pieces of suitable size, comprises two or more outlets configured for positioning along the length of the compartmentalized conveyor. In one or more embodiments, the outlets may be angled in relation to one another, in order to provide length of growth medium in two neighbouring compartments of the compartmentalized conveyor. The angle may be fixed, or may be mechanically or electronically adjusted to a given type of compartmentalized conveyor.

In one or more embodiments, the system further comprises multiple apparatuses adapted for producing lengths of growth medium cut into pieces of suitable size, and positioned on one the same side or on both sides of the compartmentalized conveyor.

In one or more embodiments, the outlets of multiple apparatuses may be angled in relation to one another, in order to provide length of growth medium in two neighbouring compartments of the compartmentalized conveyor. The angle may be fixed, or may be mechanically or electronically adjusted to a given type of compartmentalized conveyor.

As used in the specification and the appended claims, the singular forms "a", "an", and "the" include plural referents unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

It should be noted that embodiments and features described in the context of one of the aspects of the present invention also apply to the other aspects of the invention.

DETAILED DESCRIPTION OF THE INVENTION

Figure 1:
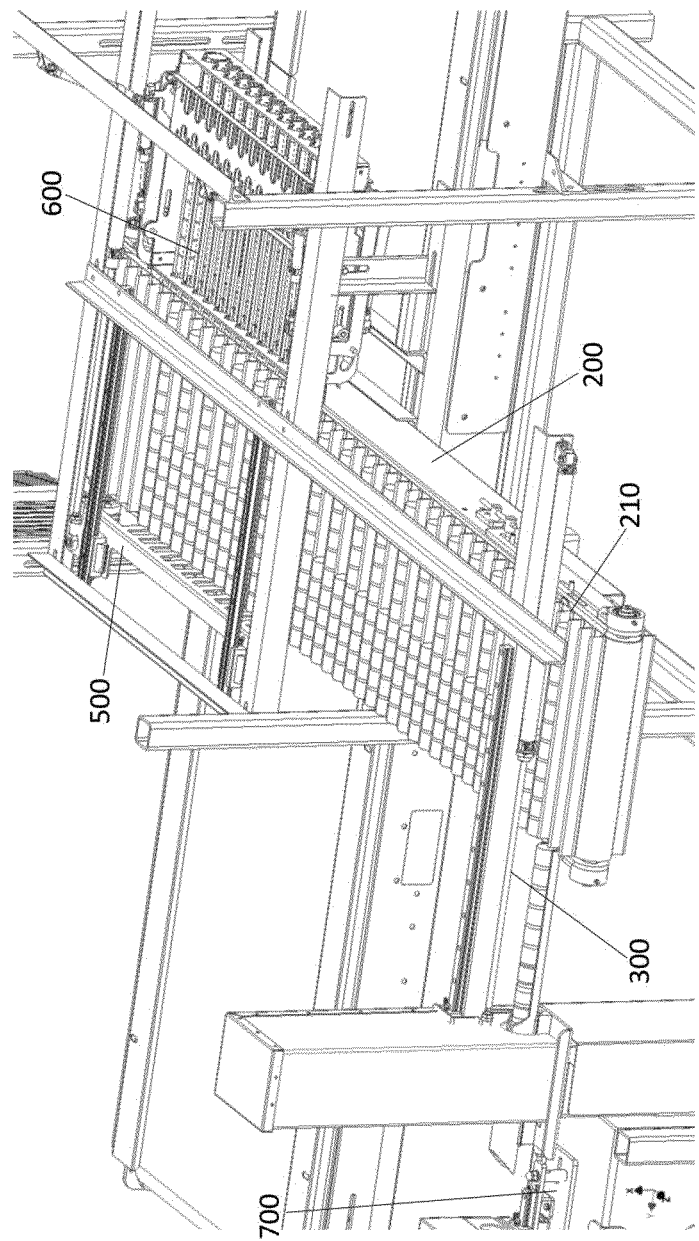
FIG. 1 shows a perspective view of the system in accordance with various embodiments of the invention.
Figure 2:
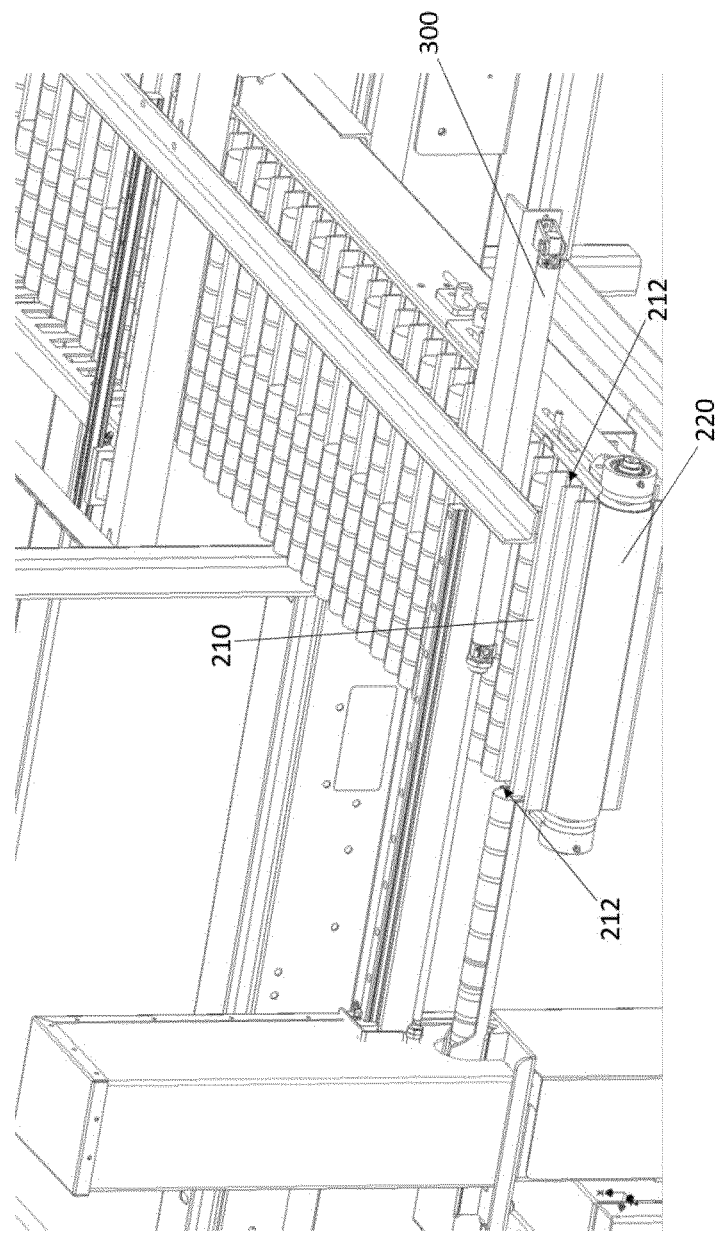
FIG. 2 shows a close-up view of the compartmentalized conveyor and first displacement means as disclosed in FIG. 1.

FIG. 1 shows a perspective view of the system in accordance with various embodiments of the invention. The system is shown comprising a compartmentalized conveyor 200 positioned in-between an apparatus 700 adapted for producing a length of growth medium cut into pieces of suitable size and a distributing means 600 adapted for positioning the individual pieces of the length of growth medium into a propagation tray (not shown). The system also comprises a first displacement means 300 adapted for positioning a length of growth medium cut into pieces of suitable size into a compartment 210 of the compartmentalized conveyor 200 through its open end (212, FIG. 2) and along the longitudinal direction of the compartment 210. Furthermore, the system comprises a second displacement means 500 adapted for transporting a length of growth medium cut into pieces of suitable size positioned within a compartment 210 of the compartmentalized conveyor 200 through the open end (212, FIG. 2) of the compartment 210 and into a distributing means 600.

Figure 3:
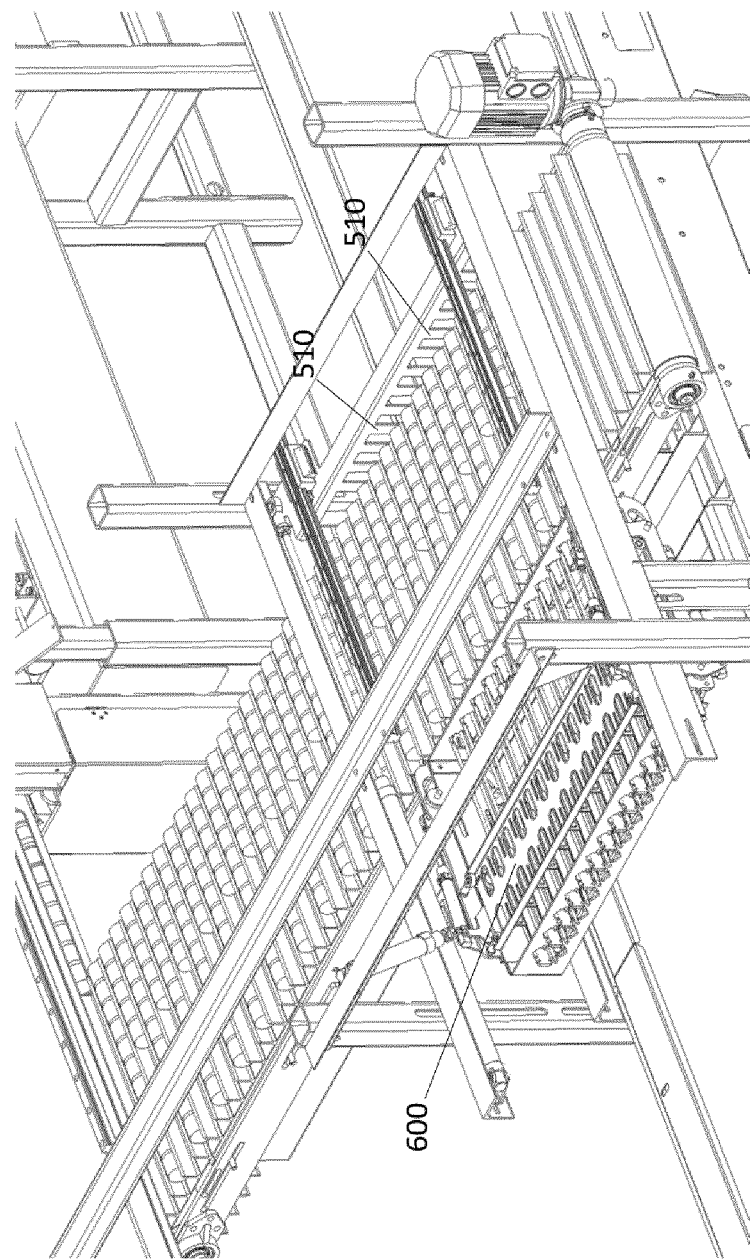
FIG. 3 shows a close-up view of the compartmentalized conveyor and second displacement means as disclosed in FIG. 1.

In FIG. 3, the second displacement means 500 is shown with a number of spade blades 510, each adapted for moving within a single open-ended compartment. The second displacement means 500 comprises a first drive means adapted to move the spade blades 510 from a first position outside the open-ended compartment to a second position within the open-ended compartment. Thereby, the distributing means 600 is loaded with a length (here, several lengths) of growth medium cut into pieces of suitable size in a single operation.

Figure 4:
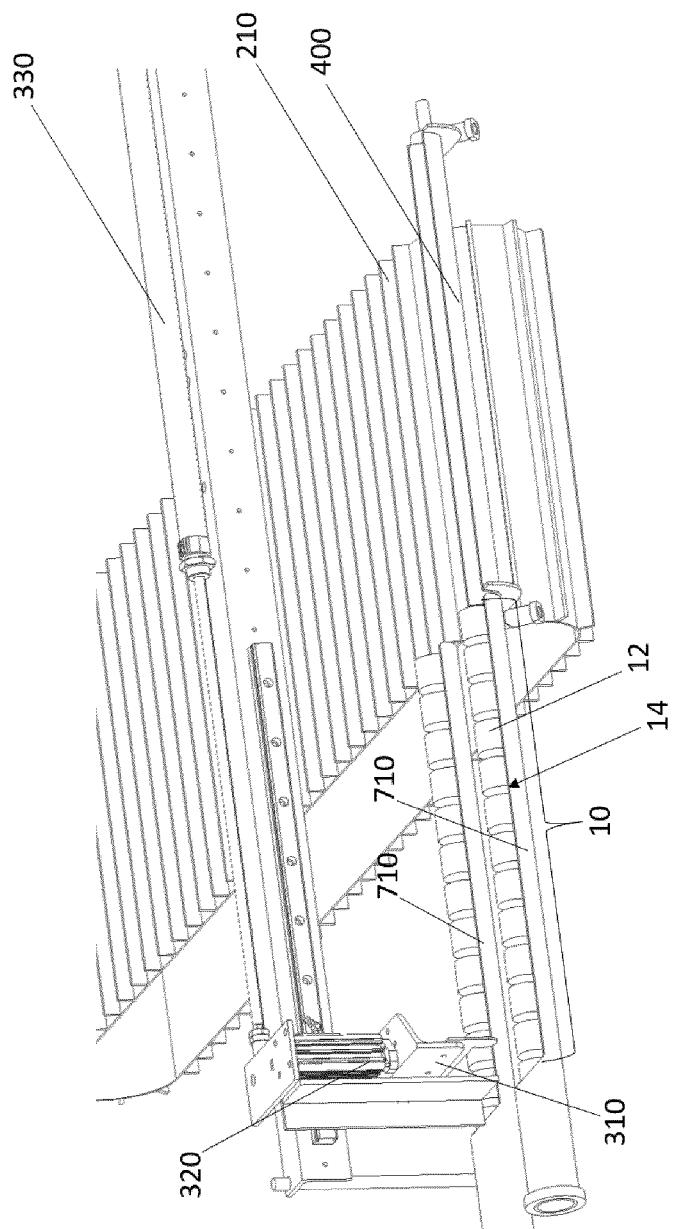
FIG. 4 shows a system where the apparatus adapted for producing a length of growth medium cut into pieces of suitable size comprises two outlets.

FIG. 4 shows a detailed view of the first displacement means 300. The first displacement means 300 is shown comprising a spade blade 310, a first drive means 320, and a second drive means 330. The spade blade 310 is configured for fitting within a cutting groove 14 between to individual growth medium pieces 12. The first drive means 320 is configured to move the spade blade from a first position above a cutting groove 14 between to individual growth medium pieces 12 to a second position within said cutting groove 14. The second drive means 330 is configured to move the spade blade above and along a length 10 of growth medium cut into pieces 12 of suitable size. Thereby, the first displacement means 300 can be configured to move different lengths of growth medium cut into pieces of suitable size into a compartment of the compartmentalized conveyor. An example of alternating lengths can be seen in FIGS. 1 and 3.

Figure 5:
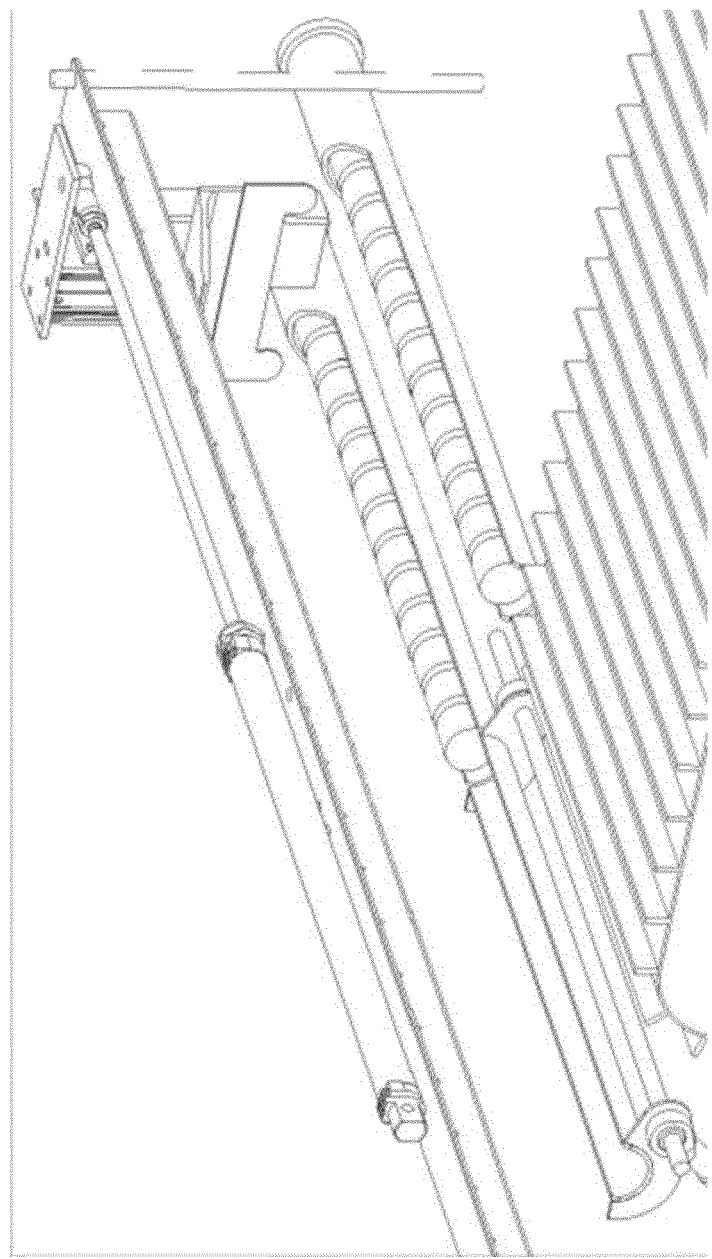
FIG. 5 shows a different view of the first displacement means shown in FIG. 4.

FIG. 4 also shows a first displacement means 300 adapted for:
a) positioning a length 10 of growth medium cut into pieces 12 of suitable size into a compartment 210 of the compartmentalized conveyor 200 through its open end 212 and along the longitudinal direction of the compartment 210; and
b) positioning a length 10 of growth medium cut into pieces 12 of suitable size into a storage tray 400; wherein the storage tray 400 is adapted for positioning a length 10 of growth medium cut into pieces 12 of suitable size into a compartment 210 of the compartmentalized conveyor 200. A different view of the first displacement means 300 is shown in FIG. 5. The apparatus 700 adapted for producing a length of growth medium cut into pieces of suitable size, comprises two outlets 710 configured for positioning along the length of the compartmentalized conveyor. Here, one outlet is positioned in front of the storage tray, while the other is positioned in front of a compartment 210. The spade blade 310 is here shown configured for fitting within a cutting groove 14 between to individual growth medium pieces 12 in both lanes simultaneously.

REFERENCES

Length of growth medium
12 Piece of growth medium
14 Cutting groove
200 Compartmentalized conveyor
210 Compartment
212 Open end
220 Belt
300 First displacement means
310 Spade blade
320 First drive means
330 Second drive means
400 Storage tray
500 Second displacement means
510 Spade blade
600 Distributing means
700 Apparatus adapted for producing a length of growth medium cut into pieces
of suitable size
710 Outlet

The invention claimed is:
1. An apparatus for transporting a length (10) of growth medium cut into pieces (12) of suitable size to a distributing means (600) adapted for positioning the individual pieces (12) of the length (10) of growth medium into a propagation tray, the apparatus comprising:
   an apparatus adapted for producing a length (10) of growth medium cut into pieces (12) of suitable size, said apparatus comprising a cutting blade; and
   a first displacement means (300) adapted for positioning a length (10) of growth medium cut into pieces (12) of suitable size, by said cutting blade, directly into a distributing means (600) adapted for positioning the individual pieces (12) of the length (10) of growth medium into a propagation tray;
   wherein the first displacement means (300) comprises a spade blade (310), a first drive means (320), and a second drive means (330); wherein the spade blade (310) is configured for fitting within a cutting groove (14) between the individual growth medium pieces (12);
   wherein the first drive means (320) is configured to move the spade blade from a first position above or below or to one side of a cutting groove (14) between the individual growth medium pieces (12) to a second position within said cutting groove (14); and
   wherein the second drive means (330) is configured to move the spade blade towards said distributing means.

2. The apparatus according to claim 1, wherein said first displacement means is adapted for positioning a single length of 2-50 growth medium pieces of suitable size into said distributing means (600).

3. The apparatus according to claim 1, wherein said first drive means (320) is configured to move said spade blade (310) from said first position above said cutting groove between to individual growth medium pieces to said second position within said cutting groove, while using said cutting blade of said apparatus adapted for producing a length of growth medium cut into pieces of suitable size as a guide.

4. The apparatus according to claim 1, wherein said second drive means (330) is configured to move said spade blade above and along a length of growth medium cut into pieces of suitable size, thereby enabling said first displacement means to move different lengths of growth medium cut into pieces of suitable size into said distributing means (600).

5. A system for packaging growth medium pots onto propagation trays comprising:
   An apparatus according to claim 1; and
   The distributing means (600) adapted for positioning the individual pieces (12) of the length (10) of growth medium into a propagation tray.

6. The system according to claim 5, wherein said first displacement means is adapted for positioning a single length of 2-50 growth medium pieces of suitable size into said distributing means (600).

7. The system according to claim 5, wherein said first drive means (320) is configured to move said spade blade (310) from said first position above said cutting groove between to individual growth medium pieces to said second position within said cutting groove, while using said cutting blade of said apparatus adapted for producing a length of growth medium cut into pieces of suitable size as a guide.

8. The system according to claim 5, wherein said second drive means (330) is configured to move said spade blade above and along a length of growth medium cut into pieces of suitable size, thereby enabling said first displacement means to move different lengths of growth medium cut into pieces of suitable size into said distributing means (600).

* * * * *